United States Patent [19]

Loyd

[11] 4,414,940
[45] Nov. 15, 1983

[54] CONDITIONED COMPRESSION IGNITION SYSTEM FOR STRATIFIED CHARGE ENGINES

[76] Inventor: Robert W. Loyd, Rte. 4, Fond du Lac, Wis. 54935

[21] Appl. No.: 253,581
[22] Filed: Apr. 13, 1981
[51] Int. Cl.³ .............................................. F02B 3/00
[52] U.S. Cl. .................................. 123/299; 123/275; 123/300; 123/301
[58] Field of Search ............... 123/298, 299, 300, 301, 123/275, 276, 279

[56] References Cited

U.S. PATENT DOCUMENTS

| 2,484,009 | 10/1949 | Barber | 123/295 |
| 2,595,915 | 5/1952 | Barber | 123/301 |
| 2,692,587 | 10/1954 | Barber | 123/304 |
| 2,864,347 | 10/1958 | Barber et al. | 123/301 |
| 2,958,314 | 11/1960 | Mitchell | 123/301 |
| 3,094,974 | 6/1963 | Barber | 123/261 |
| 3,154,059 | 10/1964 | Witzky et al. | 123/301 |
| 3,894,518 | 7/1975 | Gavrun et al. | 123/299 |
| 3,924,598 | 12/1975 | Davis | 123/306 |
| 4,031,867 | 6/1977 | Yasuda et al. | 123/299 |
| 4,091,772 | 5/1978 | Heater et al. | 123/275 |
| 4,217,871 | 8/1980 | Ohashi et al. | 123/299 |
| 4,239,023 | 12/1980 | Simko | 123/275 |

FOREIGN PATENT DOCUMENTS

| 403121 | 10/1909 | France | 123/300 |
| 899431 | 5/1945 | France | 123/299 |
| 2359279 | 3/1978 | France | 123/299 |
| 609115 | 9/1948 | United Kingdom | 123/300 |

Primary Examiner—Parshotam S. Lall
Attorney, Agent, or Firm—Robert C. Sullivan

[57] ABSTRACT

A combustion process for a stratified charge reciprocating internal combustion engine having a high pressure fuel injection system with two injectors discharging into the combustion chamber; the fuel from the first nozzle is ignited as it discharges and the heat from the burning fuel raises the temperature and pressure and chemically conditions the gas in the combustion chamber so fuel from the second injector is auto ignited as it is discharged into the combustion chamber. To provide the two injections of fuel, a simplified, electrically triggered, accumulator type multi-fuel injection system is preferred.

22 Claims, 7 Drawing Figures

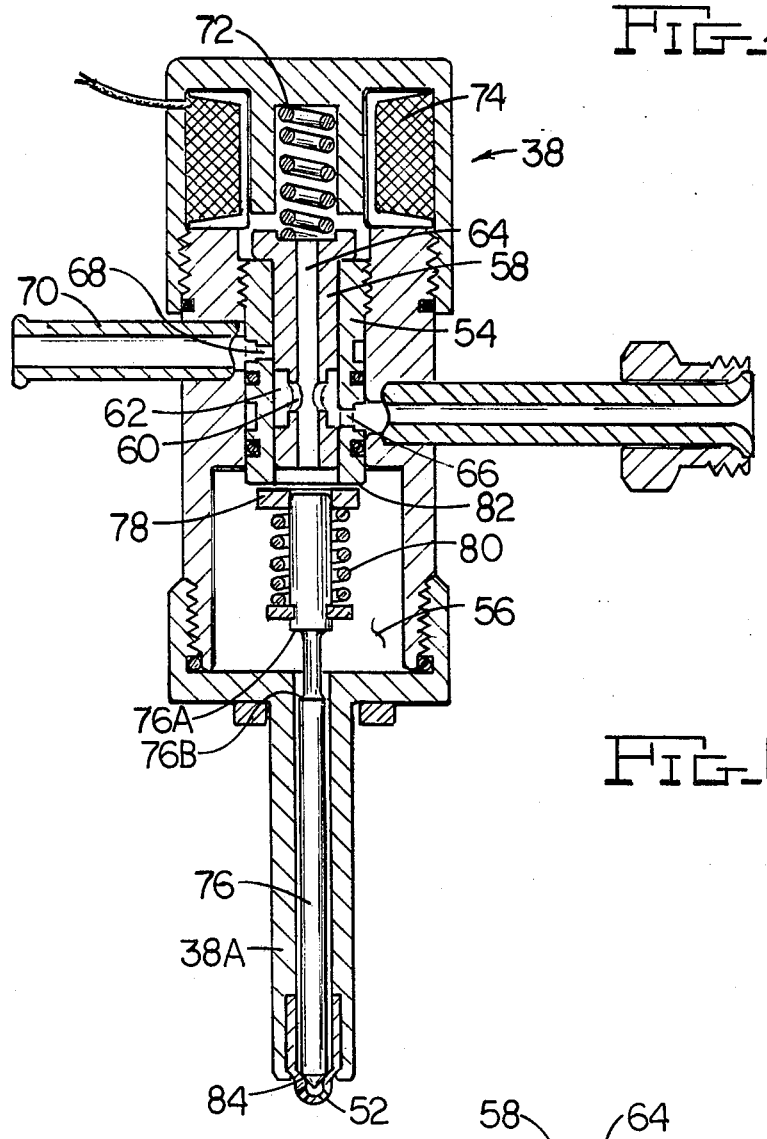
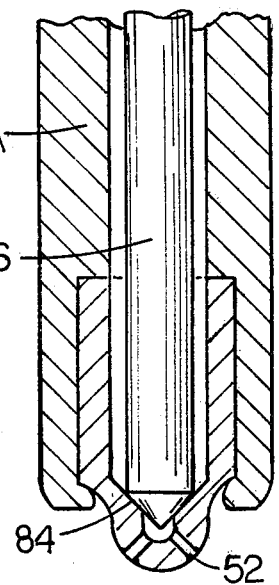
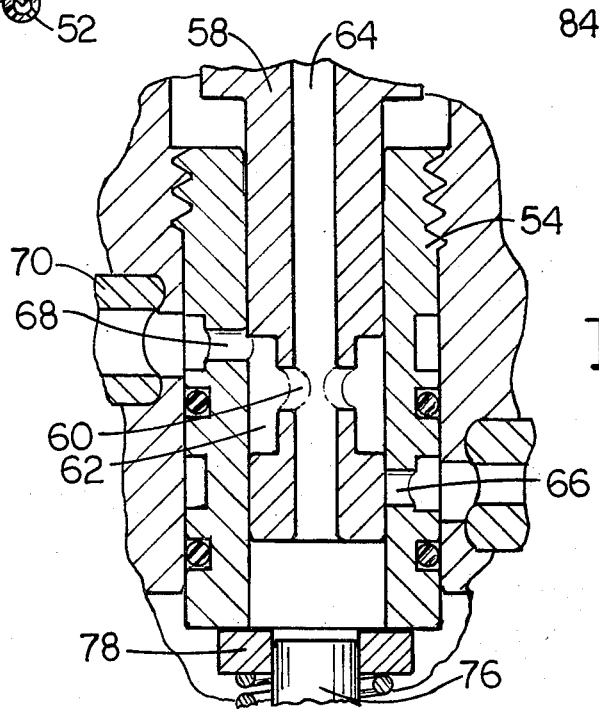

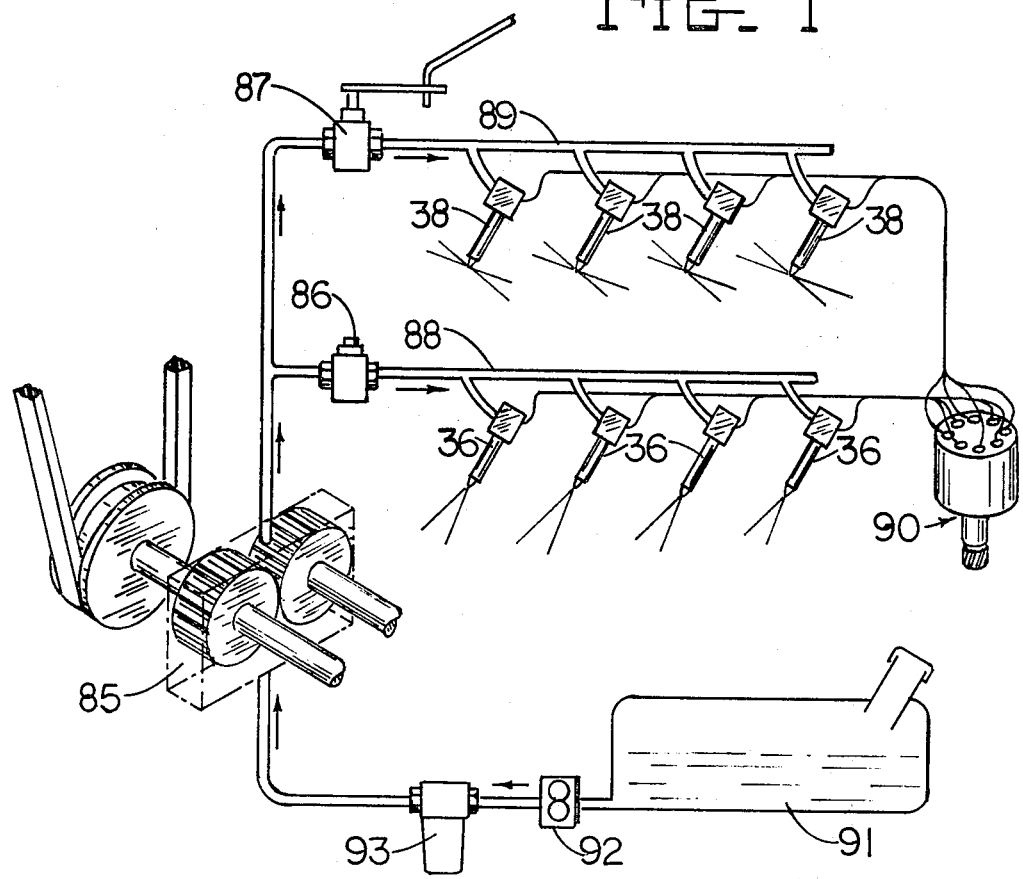

CONDITIONED COMPRESSION IGNITION SYSTEM FOR STRATIFIED CHARGE ENGINES

TECHNICAL FIELD

This invention relates to reciprocating internal combustion engines, particularly of the type that operate on the stratified charge principle and, more particularly, to an improved process and system for operating internal combustion engines on the stratified charge principle, and to a reciprocating internal combustion engine which operates in accordance with this improved process and system.

BACKGROUND OF THE PRIOR ART

The problems of exhaust gas pollution and high fuel consumption in internal combustion engines are well recognized today. One of the approaches for minimizing these problems is to design the engine for operation with a stratified charge. The definition of "stratified charge" is where the air-fuel mixture in the combustion chamber is not uniform and is generally very lean, with special provisions existing to ignite the mixture.

In a stoichiometric mixture of air and gasoline fuel (i.e., the air-gasoline mixture which is theoretically correct for proper combustion), the ratio by weight of air to gasoline is approximately 14.9:1. A charge having an air-fuel ratio leaner than 18:1 cannot be consistently ignited by a spark plug. Conventional carbureted or non-stratified charge engines operate generally with an air-fuel ratio in the range of 11:1 for a mixture which is richer than the ideal stoichiometric mixture to 16:1 for a mixture which is leaner than the ideal stoichiometric mixture.

Stratified charge engines with unrestricted air intake, however, have been successfully operated at the extremely low overall air-fuel ratios, for example, from the 20:1 to the 100:1 range.

Compared to engines operating in the approximately stoichiometric air-fuel ratio range, an engine operating on a leaner air-fuel ratio, as seen in FIG. 3, results in a significant reduction in both the oxides of nitrogen ($NO_x$) and carbon monoxide in the engine exhaust and generally in some reduction of the hydrocarbons. In addition, there is normally a reduction in engine fuel consumption in a stratified charge engine having unrestricted air intake because of the lower pumping losses on the intake or suction stroke of the engine cycle due to the free flow of air into the combustion chamber.

The following U.S. Pat. Nos. are representative of patents showing internal combustion engines operating on the stratified charge principle:

2,484,009—Everett M. Barber—issued Oct. 11, 1949
2,595,915—Everett M. Barber—issued May 6, 1952
2,692,587—Everett M. Barber—issued Oct. 26, 1954
2,864,347—Everett M. Barber et al—issued Dec. 16, 1958
2,958,314—Edward Mitchell—issued Nov. 1, 1960
3,094,974—Everett M. Barber—issued June 25, 1963
3,924,598—Charles W. Davis—issued Dec. 9, 1975

Difficulty, however, has been experienced in operating stratified charge engines over an entire operating range while maintaining acceptable firing regularity and good engine performance.

Some prior art stratified charge engines and processes have required certain air flow patterns and fuel spray patterns in order to achieve regular firing. A number of the prior art patents show the use of a pilot fuel spray which is ignited by a spark plug to establish a flame which is used to ignite a main fuel spray, which requires that the main fuel spray be directed or oriented in a manner which causes the main fuel spray to properly contact the flame front established by the ignited pilot fuel spray.

STATEMENT OF THE INVENTION

It is an object of this invention to provide an improved combustion process for stratified charge reciprocating internal combustion engines which can provide smooth, efficient operation over a range of lean air-fuel ratios throughout the engine's load and speed operating range.

It is another object of the invention to provide a combustion process for use with a stratified charge internal combustion engine in which the air in the combustion chamber is "conditioned" to reach a pressure and temperature condition at which auto ignition of a main fuel spray occurs, which permits the main fuel spray to be shaped to conform with or fit the combustion chamber shape rather than requiring the main fuel spray to be shaped to contact a flame front established by a pilot igniter, as in the prior art.

It is another object of the invention to provide an engine configuration which includes two injection nozzles per cylinder, and a method of operating such an engine in which the fuel discharged into the combustion chamber through the first or pilot nozzle is ignited as it discharges; and in which the heat from the pilot fuel burn increases the temperature and pressure and chemically conditions the air in the combustion chamber to a level which provides auto ignition of fuel which is later discharged into the combustion chamber through a second or main fuel nozzle.

It is a further object of the invention to provide a combustion process for a stratified charge reciprocating internal combustion engine which may be used with an engine having a low compression ratio in the range of compression ratios typical of those employed in carbureted engines, which permits a structural design having a strength similar to that of a low compression ratio carbureted engine, with resulting greater economy in engine manufacturing costs.

It is still a further object of the invention to provide a combustion process for use with a stratified charge internal combustion engine which does not require particular air flow patterns or fuel spray patterns in order to achieve regular firing but in which the fuel spray pattern can be made to conform with or fit the combustion chamber shape.

It is still a further object of the invention to provide a combustion process operating on the stratified charge principle in which it is practical to modify existing engines to use the subject process.

Still another object of the invention is to provide a reciprocating internal combustion engine operating upon the stratified charge principle which has low pumping losses on the suction stroke of the engine; which has multi-fuel capability and can burn gasoline, diesel or jet fuels; which has improved fuel economy; and which has lower exhaust emissions as compared to a carbureted engine because of lean air-fuel mixtures.

It is still another object of the invention to provide a combustion process for a stratified charge reciprocating internal combustion system in which a pilot fuel and a main fuel are injected into the combustion chamber of the engine by means of a simplified, electrically triggered accumulator type injection system.

SUMMARY OF THE INVENTION

In accordance with the invention the combustion process is carried out on a stratified charge engine in which the engine air intake passage preferably is characterized by the absence of any air throttle valve, allowing air to be inducted on the intake stroke with the minimum of restriction. During the compression stroke, fuel is injected from the first of two fuel injection nozzles, the pilot nozzle. Fuel from the pilot nozzle is ignited by a spark plug located adjacent to the pilot nozzle. The combination of normal compression of air in the combustion chamber and the burning of pilot fuel increases the pressure and temperature within the combustion chamber to provide an environment in the combustion chamber that will auto ignite fuel injected by the No. 2 or main injector. The fuel from the second or main fuel nozzle is controlled to regulate the power output of the engine. Because fuel from the second nozzle is auto ignited as it enters the combustion chamber, similar to a compression ignition diesel engine, the orientation of the spray pattern of the main fuel is not fixed nor is a particular air swirl required as in the configurations disclosed in U.S. Pat. Nos. 2,484,009, 2,121,920, and 2,692,587. Instead, the main fuel spray pattern can be designed to fit the combustion chamber shape. The main fuel nozzle in most applications would be multi-hole; the size and number of holes would depend on the engine displacement and configuration. The pilot nozzle is a single orifice design with a constant quantity of pilot fuel injection, such as 75% of the idle fuel requirement, for example.

The burning of pilot fuel in the combustion chamber not only increases the pressure and temperature in the combustion chamber, but it also chemically conditions the gases in the chamber. This reduces or eliminates the ignition delay period of the main fuel as it is injected into the combustion chamber, thus contributing to a smooth and consistent operation.

An additional feature of the conditioned compression ignition system of the invention is that it will accommodate a variety of fuels from gasoline to diesel and jet fuels, providing the possibility of using the cut of fuel that will provide the largest energy output per barrel of crude.

To provide the two injections of fuel, an electrically triggered accumulator type multi-fuel injection system is preferred.

Further objects and advantages of the invention will become apparent from the following description taken in conjunction with the accompanying drawings in which

BRIEF DESCRIPTION OF DRAWINGS

FIG. 4 is a cross-section of an electrically triggered accumulator-type fuel injection nozzle which may be employed for both the main and pilot injection of the engine illustrated in FIG. 1;

FIG. 5 is an enlarged partial sectional view of the fuel injection nozzle of FIG. 4 showing the shuttle valve which forms part of the fuel injector;

FIG. 6 is an enlarged fragmentary sectional view showing the spray tip of the fuel injection nozzle of FIG. 4; and FIG. 7 is a diagrammatic illustration of a fuel supply system which may be employed to pressurize the fuel injection nozzles of FIG. 4.

DESCRIPTION OF THE PREFERRED EMBODIMENT

Figure 1:
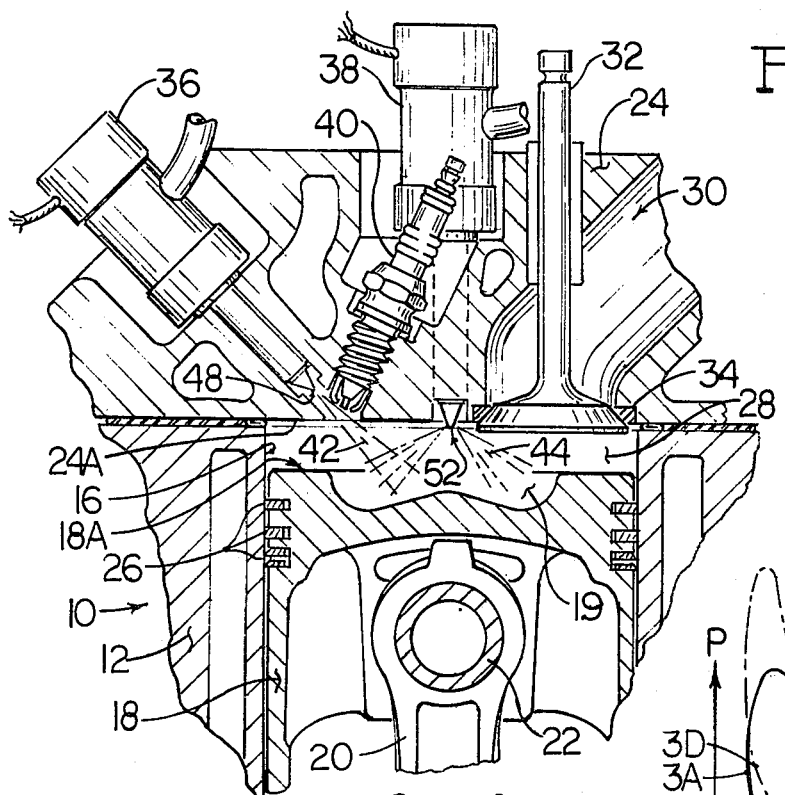
FIG. 1 is a view in section of a single cylinder of an internal combustion engine employing the process and construction of the invention, showing the piston approaching, but not having quite reached, top dead center during the compression stroke.

Referring to FIG. 1, there is shown a single cylinder of a reciprocating four-stroke cycle engine generally indicated at 10, in accordance with the invention, and with which the combustion process of the invention may be used. Engine 10 comprises a crankcase 12 which is the main structural member supporting a crankshaft 14. Crankcase 12 is bored to provide any desired number of cylinders 16, each receiving a reciprocating piston 18 connected by connecting rods 20 to crankshaft 14. The upper surface of piston 18 is recessed to provide an upwardly opening cavity 19 in the upper end of the piston. Cylinders 16 are closed at the upper ends thereof by a cylinder head 24.

Piston 18 is provided contiguous its upper end with sealing rings 26 which seal gases in the combustion chamber 28 in the cylinder between piston 18 and cylinder head 14. The size or volume of combustion chamber 28 varies with the travel of piston 18 between a maximum when the piston is at the bottom of its travel or at bottom dead center position as related to the rotation of crankshaft 14, and a minimum when piston 18 is at the top of its travel or at the top dead center position as related to crankshaft rotation.

Air is admitted to combustion chamber 28 through an unthrottled air inlet passage 30 for each cylinder 16 controlled by a corresponding air inlet valve 32 in cylinder head 24, valve 32 being shown closed against its seat 34 in the view of FIG. 1. An exhaust valve (not shown) for each cylinder 16 is also carried by cylinder head 24, The inlet and exhaust valves for each cylinder may be biased to a closed condition by corresponding springs (not shown) and opened by operation of a crankshaft (not shown) in a manner well known in the art.

As is well known, the ratio of the volume of the combustion chamber at the beginning of the compression stroke to the volume of the combustion chamber at the end of the compression stroke when the piston 18 is at top dead center (TDC) is referred to as the compression ratio. It is a significant aspect of the process and apparatus of the present invention that engine 10 has a low compression ratio range typical of that used for carbureted gasoline fuel engines such as a compression ratio in the range of 8:1 to 10:1, as distinguished from a high compression ratio such as 16:1 which is typical of a compression ignition engine such as a diesel engine. The low compression ratio characteristic of the engine 10 permits the engine to have a structural design having a strength similar to that of a low compression ratio carbureted engine, with resulting greater economy in engine manufacturing costs.

Fuel is spray-injected directly into combustion chamber 28 by a pilot injection nozzle 36 and by a main injection nozzle 38 mounted in the head of each cylinder 16, as will be described more fully hereinafter. The fuel which is spray-injected by pilot injection nozzle 36 and by main injection nozzle 38 may be any one of a variety of fuels such as gasoline, diesel fuel, or jet fuel, permitting the use of a cut or fraction of fuel which will provide the largest energy output per barrel of crude. In a given engine, the same fuel is used by both pilot injection nozzle 36 and by main injection nozzle 38.

A spark plug 40 for each cylinder is secured in cylinder head 24, with the arcing portion of the spark plug disposed adjacent the fuel discharge tip of pilot fuel injection nozzle 36 and contiguous the path of the pilot fuel spray issuing from injection nozzle 36.

DESCRIPTION OF OPERATION

The engine 10 shown in FIG. 1 operates in accordance with a four-stroke cycle. On the first stroke of the cycle, piston 18 is moved downwardly with air inlet valve 32 open and with the exhaust valve (not shown) closed. The downward movement of piston 18 causes air to flow through the unrestricted intake or inlet passage 30 into combustion chamber 28. On the second stroke of the cycle, air inlet valve 32 is closed and the exhaust valve remains closed, and piston 18 is moved upwardly to compress the air in combustion chamber 28. While the air in combustion chamber 28 is being compressed, its pressure increases and its temperature also increases. To further prepare the air in combustion chamber 28, and in accordance with the process of the present invention, when piston 18 is in the range from 12° to 50° in relation to crank rotation before top dead center (TDC) on its upward movement during the compression stroke, pilot injection nozzle 36 is caused to discharge pilot fuel into combustion chamber 28 in a spray 42. The optimum timing at which pilot fuel injection occurs would be developed for each application. The amount of fuel injected by pilot injection nozzle 36 on each injection is a constant amount such as 75% of the idle fuel requirement. Simultaneously with the injection of the pilot fuel, the igniter spark plug 40 is caused to fire, thus causing the fuel in pilot fuel spray 42 to burn. The result of the burning of pilot fuel spray 42 is to increase the pressure and temperature of the air in combustion chamber 28, and also to chemically condition the air or gas in combustion chamber 28.

The chemical conditioning of the gas or air in combustion chamber 28 reduces or eliminates the ignition delay period of the main fuel as it is injected into the combustion chamber, thus contributing to a smooth and consistent operation of engine 10.

Main fuel is injected through main fuel injection nozzle 38 into combustion chamber 28 subsequent to the injection of the pilot fuel charge and prior to the time that piston 18 reaches top dead center on the compression stroke. For example, main fuel injection nozzle 38 may be activated to discharge the main fuel at 10° or less in relation to crank rotation before piston 18 reaches top dead center on the compression stroke. The amount of the main fuel discharged into combustion chamber 28 by main fuel injection nozzle 38 is variable and is controlled to regulate the power output of engine 10. Since air is admitted to combustion chamber 28 through an unthrottled intake passage, the air-fuel ratio will always be in the lean mixture range over the operating range of the engine.

It will be noted that main fuel spray 44 conforms substantially to the shape of cavity 19 in the upper surface of piston 18. In the position of piston 18 in the view of FIG. 1, the piston is nearing but has not quite reached top dead center on the compression stroke, and when piston 18 reaches top dead center, cavity 19 will define a large percentage of the volume of the combustion chamber 28, since the flat top surface area 18A bounding cavity 19 at that time will be very close to the lower or under surface 24A of cylinder head 24.

As the droplets of fuel in main fuel spray 44 from main fuel injection nozzle 38 enter combustion chamber 28, the fuel droplets mix with the heated compressed air and auto ignite, causing a greatly increased pressure which pushes piston 18 down on its power stroke, the third stroke of the four-stroke cycle. To complete the cycle, the exhaust valve (not shown) is opened and piston 18 is moved upwardly in cylinder 16, thus exhausting the spent gases from combustion chamber 28 and completing the four-stroke cycle.

For a discussion of ignition delay in compression ignition engines, reference is made to the book, "The Internal Combustion Engine", particularly page 183 thereof, by C. Fayette Taylor and Edward S. Taylor, First Edition, Sixth Impression, 1945, published by International Textbook Company, Scranton, Pa.

Figure 2:
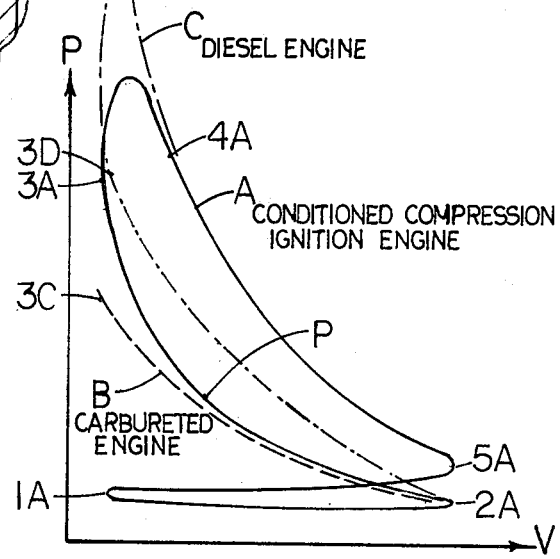
FIG. 2 is a typical pressure-volume diagram to graphically illustrate the principle of the present invention and additionally showing typical compression lines for a carbureted engine and for a diesel engine for comparison.
Figure 3:
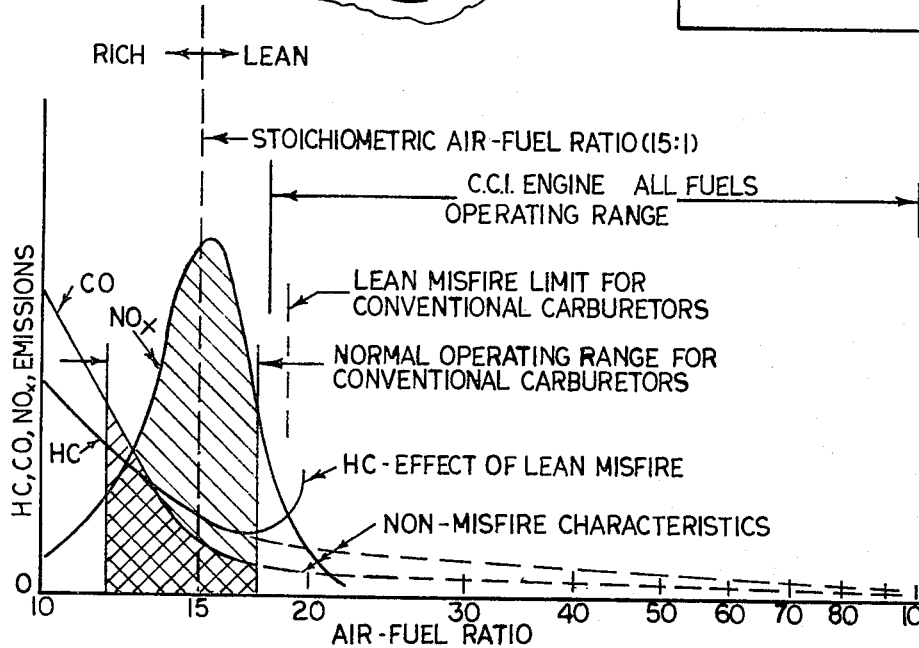
FIG. 3 is a graph depicting exhaust emission quantities of hydrocarbons, carbon monoxide, and oxides of nitrogen plotted against air-fuel ratio for internal combustion engines and illustrating the advantages of operating an engine at an air-fuel ratio which is leaner than the normal operating range for conventional carbureted engines.

Referring to FIG. 2, the full line pressure-volume diagram generally indicated at A graphically represents the pressure and volume relationships during the four-stroke cycle of an internal combustion engine having a compression ratio of 8:1 and operating in accordance with the conditioned compression ignition system of the present invention. The curve generally indicated at B in FIG. 2 and defined by the dashed line 2A-3C represents the pressure-volume relationship on the compression stroke of a carbureted engine with a compression ratio of 8:1. The curve generally indicated at C and defined by the dashed line 2A-3D represents the pressure and volume conditions on the compression stroke of a diesel engine with a compression ratio of 16:1.

Note that the point 2A in FIG. 2 is common to the pressure-volume diagram A, and also to the curves B and C.

Consider now the pressure-volume diagram indicated at A which relates to an engine operating in accordance with the conditioned compression ignition system of the present invention:

The cycle starts with line 1A-2A which represents the increase in volume of combustion chamber 28 of FIG. 1 as piston 18 moves downwardly and air inlet valve 32 of FIG. 1 is in the open position. The solid line 2A-3A represents the pressure increase during the compression stroke, and shows the effect of adding energy by a pilot burn which starts at a point P on line 2A-3A which is approximately 50° in relation to crank rotation before piston 18 reaches top dead center during the compression stroke.

It will be noted that the compression stroke portion of the pressure-volume diagram A from point 2A to point P where pilot injection and ignition of the pilot fuel commences is very similar to the corresponding portion of curve B for the carburetor engine having the same compression ratio. However, once injection and ignition of the pilot fuel has occurred at point P on curve A, curve A then rises at a very rapid rate along the vertical or pressure axis, and much more rapidly than curve B rises, indicating the rapid increase in pressure due to the energy added by pilot fuel burn which occurs in combustion chamber 28 commencing at point P.

The main fuel is injected through main fuel nozzle 38 at point 3A on diagram A just prior to the top dead center position of piston 18 on the compression stroke, and line 3A-4A represents the pressure and volume conditions during the burn of the main fuel injected through main fuel nozzle 38. Line 3A-5A represents the increase or expansion of combustion chamber 28 as piston 18 moves downwardly on the power stroke. Line 5A-1A represents the exhaust stroke where exhaust valve is opened and piston 18 moves upward in cylinder 16 to reduce the volume of combustion chamber 28.

It should be noted that when main fuel injection occurs at point 3A on pressure-volume diagram A of FIG. 2 that the pressure in combustion chamber 28 of engine 10 is approximately equivalent to the pressure at point 3D on curve C at which fuel injection occurs in the diesel engine represented by curve C, although as seen in FIG. 2 the maximum pressure reached in the diesel engine subsequent to the injection of the total fuel reaches a substantially higher pressure value than the maximum pressure value reached in engine 10 using the method and process of the present invention.

While the cycle described in connection with pressure diagram A of FIG. 2 is for a four-stroke cycle engine, the conditioned compression ignition system of the invention will function equally well in a two-stroke cycle engine.

DESCRIPTION OF FUEL INJECTORS

The fuel injection system used in the conditioned compression ignition system of the invention may be of the conventional type using jerk type pumps operating in conjunction with differential opening nozzles as is well known in the art. The fuel injection system which is used could also be a special system for two nozzles in a cylinder head as described in U.S. Pat. No. 4,239,023 issued to Aladar O. Simko, where the pilot nozzle is shown to inject fuel into a precombustion chamber. However, a conventional fuel injection system utilizing jerk type pumps and differential opening nozzles or, alternatively, the special system of U.S. Pat. No. 4,239,023 just mentioned would be cumbersome and complex. Therefore, a simplified system making use of an electrically triggered accumulator type injection nozzle such as that shown and illustrated in FIGS. 4, 5 and 6 is preferred.

In the illustrated embodiment shown in FIG. 1, pilot injection nozzle 36 is disposed angularly, such as at an angle of 45°, relative to the axis of cylinder 16 and fuel spray 42 issues from a single discharge orifice 48 of the pilot nozzle 36.

The main fuel injection nozzle 38 in the illustrated embodiment is shown as being disposed generally vertically and in alignment with the vertical axis of cylinder 16, and main fuel spray 44 issues from main fuel nozzle portion 38A through a plurality of orifices 52 provided in the tip of nozzle portion 38A.

It should be noted that the particular orientation of the pilot injection nozzles 36 and of the main injection nozzle 38 shown in the embodiment of FIG. 1 is not critical, since the direction of fuel spray from each nozzle is determined by the direction of drilling of the discharge orifices in the respective nozzles.

The structure of the electrically triggered accumulator type injection nozzle which may be used for either pilot nozzle 36 or for main nozzle 38 is shown in detail in FIGS. 4, 5, and 6. The fuel injection nozzle shown in FIGS. 4, 5, and 6 will be described as embodied in the main nozzle 38, although a similar structure and arrangement may be used for pilot nozzle 36. As shown in FIGS. 4, 5, and 6, nozzle 38 comprises a body 54 having an accumulator chamber 56 in fluid communication with the projecting nozzle portion 38A. A shuttle valve member 58 is slidable in body 54 and is provided with a diametral passage 60 which communicates with opposed portions of a circumferential recess 62 which opens peripherally of the shuttle valve member. Shuttle valve 58 further includes an axial passage 64 which intercepts the diametral passage 60 and opens to the opposed ends of the shuttle valve member.

The shuttle valve member 58 is movable axially between a fuel supply position and a drain position. In the fuel supply position, the circumferential recess 62 of the shuttle valve member communicates with the inlet passage 66 in the injector body 54 to place fuel inlet line 66 in communication with accumulator chamber 58. Fuel inlet line 66 is connected to a source of high pressure fuel, such as manifold 89 (FIG. 7). In the drain position of shuttle valve member 58, as generally shown in FIG. 5, fuel line 66 is blocked by the shuttle valve member 58 as the circumferential recess 62 in the shuttle valve now communicates with the outlet passage 68 to drain line 70. The shuttle valve member 58 is normally biased to the fuel supply position shown in FIG. 4 by the spring 72. When electrical coil 74 is energized, shuttle valve 58 moves against the bias of spring 72 to the drain position.

Fuel spray into the combustion chamber of cylinder 16 is controlled by the movable valve needle 76 which extends from accumulator chamber 56 into the nozzle portion 38A of main injection nozzle 38. The end of valve needle 76 within accumulator chamber 56 carries an annular check valve member 78 which is normally biased by spring 80 towards closure against the annular valve seat 82 of nozzle body 54. When shuttle valve 58 is in the fuel supply position shown in FIG. 4, spring 80 forces needle valve 76 to bear against the nozzle seat 84 to close the orifices 52 in the nozzle tip, as best seen in the view of FIG. 6 while, simultaneously, fuel pressure on check valve 78 causes valve 78 to unseat and permits fuel to move past the open check valve member 78 into accumulator chamber 56. When the pressure on opposed sides of check valve member 78 is equalized, check valve 78 is forced by the bias of spring 80 to closed position against valve seat 82 to trap the stored fuel in accumulator chamber 56.

At the proper time during the compression stroke of piston 18 when it is required to inject the fuel spray, coil 74 is electrically energized causing shuttle valve 58 to move upwardly closing off the high pressure fuel supply passage 66 and opening drain passage 68. This reduces the pressure above the injector needle 76 causing it to lift due to the pressure exerted on the differential areas 76A and 76B in the configuration of the needle valve 76. As the needle valve 76 lifts from its seat 84, high pressure fuel from accumulator chamber 56 is discharged into combustion chamber 28 through the discharge orifices 52 in nozzle 38A. As the pressure in accumulator chamber 56 is dissipated, spring 80 causes needle valve 76 to move back to its seat 84, ending fuel injection. Then, when the electrical current to coil 74 is cut off, shuttle valve 58 is returned by spring 72 to a position allowing admission of high pressure fuel to accumulator chamber 56, and the sequence just described is repeated.

It should be noted that the cycle just described in accordance with which fuel is admitted to accumulator chamber 56 and is subsequently discharged through the discharge orifice 48 in the case of the pilot injector 36 (or through discharge orifice 52 in the case of main injector 38) occurs on each four-stroke cycle of the engine in the case of a four-cycle engine.

The amount of fuel delivered on each injection is determined by the pressure of the high pressure fuel stored in accumulator chamber 56. Fuel in the 3,000 pounds per square inch range would deliver minimum quantities on each injection, while fuel in the 10,000 to 20,000 pounds per square inch range would deliver much higher quantities. The maximum pressure to be used and the volume of accumulator chamber 56 is determined for each engine design and would depend upon the engine displacement and the desired brake mean effective pressure (BMEP) rating of the engine.

It should also be noted that accumulator chamber 56 remains filled with high pressure fuel at all times during the admission and discharge cycle of the fuel as just described, but the density of the fuel in accumulator chamber 56 varies during the cycle, being more dense when fuel is being admitted to accumulator chamber 56, and being less dense as fuel is withdrawn from chamber 56.

There is shown in FIG. 7 a schematic diagram showing the general arrangement of a fuel system for the conditioned compression ignition engine 10 using the accumulator injector shown in FIGS. 4, 5, and 6.

The flow sequence for fuel to pilot injectors 36 starts with fuel being pumped from fuel tank 91 by transfer pump 92, the fuel flowing through a fuel filter 93 as it flows to the high pressure pump 85. Pump 85 is illustrated as a high pressure gear type pump which does not require timing to the engine crankshaft and may run at any speed ratio. High pressure fuel from pump 85 is delivered to a pressure regulating valve 86 which maintains a constant pressure in pilot manifold 88. Fuel is delivered from pilot manifold 88 to each pilot injection nozzle 36 as required. The amount of fuel delivered by each pilot nozzle 36 to combustion chamber 28 is determined by the pressure level maintained in pilot manifold 88, and the amount of fuel delivered by each pilot injector 36 is a constant which may be, for example, 75% of the amount of the idle fuel requirement. The timing of the pilot nozzles is controlled by electric control device 90 which may be a distributor mechanism or an electric timing device. Timing device 90 may also control the firing of spark plugs 40.

The flow sequence for fuel to main injection nozzles 38 is similar to that just described for the pilot injection nozzles 36. Fuel for main nozzles 38 passes from fuel tank 91, through transfer pump 92 and fuel filter 93 to high pressure pump 85. High pressure fuel is delivered to pressure control valve 87 which is controlled by the engine throttle or by the engine power and speed control device. Pressure control valve 87 controls the fuel pressure in main injector manifold 89 which, in turn, determines the amount of main fuel which will be injected by main injection nozzles 38 on each four-stroke cycle of piston 18 into combustion chamber 28 as previously described. The amount of main fuel which is injected is a variable which depends upon the speed and power requirements of engine 10. The timing of injection by main injection nozzles 38 is determined by an electrical signal from control device 90. The electric control device 90 may be so constructed as to provide the necessary advance or retard of injection timing to provide optimum operational characteristics of engine 10.

From the foregoing detailed description of the invention, it has been shown how the objects of the invention have been obtained in a preferred manner. However, modifications and equivalents of the disclosed concepts, such as readily occur to those skilled in the art, are intended to be included within the scope of this invention.

The embodiments of the invention in which an exclusive property or privilege is claimed are defined as follows:

1. A combustion process for use in a reciprocating internal combustion engine having at least one cylinder and a piston reciprocally movable in said cylinder to define a variable volume combustion chamber, said process comprising the steps of supplying air to the combustion chamber, said air being admitted to the combustion chamber through an intake passage which is substantially unthrottled thereby providing a minimum restriction on the intake of incoming air, said air entering the combustion chamber in a flow path independent of any special air flow pattern or swirl pattern requirement to accommodate ignition of the fuel, compressing the air in the chamber, introducing a pilot fuel charge from a first fuel nozzle into the combustion chamber after the air therein has been partially compressed, igniting the pilot fuel charge substantially immediately upon its issuing into the combustion chamber to cause a pilot fuel burn, the energy derived from said pilot fuel burn serving to increase the temperature and pressure of the gas in the combustion chamber, and subsequent to said pilot fuel burn introducing a main fuel charge from a second fuel nozzle into said combustion chamber whereby auto ignition of said main fuel occurs, said main fuel injected into the combustion chamber by said second nozzle being in a spray pattern shaped to fit the combustion chamber for best burning efficiency rather than being in a spray pattern which provides contact with a flame front established by the ignition of the pilot fuel, the engine power output being controlled by varying the quantity of main fuel charge injected by said second nozzle, whereby the air-fuel ratio will vary with load changes but will always be substantially in the lean mixture range, said internal combustion engine with which said process is used having a compression ratio which is in a range characteristic of the compression ratio range of a carbureted engine, whereby the internal combustion engine with which said process is used may have a structural strength design characteristic of that of a carbureted engine rather than the heavy structure of a compression ignition engine.

2. A combustion process as defined in claim 1 in which said main fuel charge is introduced from said second fuel nozzle into the combustion chamber commencing at a time when the piston is near the top dead center position on the compression stroke and the volume of the chamber is near the minimum.

3. A combustion process as defined in claim 1 in which the pilot fuel charge is introduced into the combustion chamber commencing substantially 12° to 50° before the top dead center position of the piston on the compression stroke of the piston.

4. A combustion process as defined in claim 1 in which the main fuel charge is introduced from said second fuel nozzle into the combustion chamber when said piston is as much as 10° before top dead center during the compression stroke of said piston.

5. A combustion process as defined in claim 1 in which the quantity of pilot fuel charge injected by the first fuel nozzle is a constant quantity of fuel per injection throughout the operating range of the engine.

6. A combustion process as defined in claim 5 in which the pilot fuel charge injected by said first fuel nozzle comprises approximately 75% of the engine idle fuel requirements.

7. A combustion process as defined in claim 1 in which said first and second fuel nozzles are part of a fuel injection system which uses electrically triggered accumulator type injectors which operate at pressures substantially 3,000 pounds per square inch and above to supply the pilot and main fuel charges.

8. A combustion process as defined in claim 1 in which the energy derived from said pilot fuel burn chemically conditions the gas in said combustion chamber, whereby to reduce or eliminate the ignition delay period of the main fuel as it is injected into said combustion chamber.

9. A combustion process as defined in claim 1 in which the internal combustion engine with which said process is used has a compression ratio substantially in the range of 8:1 to 10:1.

10. A combustion process as defined in claim 1 which includes a fuel injection system comprising a high pressure pump which does not require timing to the engine crankshaft, said pump supplying high pressure fuel to a first pressure regulating valve which controls the pressure of fuel in a pilot injector manifold and to a second pressure regulating valve which controls the pressure in a main injector manifold.

11. A combustion process as defined in claim 10 in which said first fuel nozzle is connected to said pilot injector manifold, and said first pressure regulating valve controls the pressure in said pilot injector manifold to cause the quantity of pilot fuel charge injected by said first fuel nozzle to be a constant quantity of fuel per injection throughout the operating range of the engine.

12. A combustion process as defined in claim 10 in which said second fuel nozzle is connected to said main injector manifold, and said second pressure regulating valve controls the pressure in said main injector manifold to cause the quantity of main fuel charge injected by said second fuel nozzle to vary to accommodate changing power requirements of the engine.

13. A combustion process as defined in claim 10 in which the timing of injection of both the pilot fuel and the main fuel is provided by an electrical signal from a control unit, and in which said control unit provides variations in timing as the engine speed and load conditions change.

14. A combustion process as defined in claim 10 in which said fuel injection system is a multi-fuel system which will accommodate a variety of liquid fuels, the same fuel being used in a given engine by both the pilot injection nozzle and by the main injection nozzle.

15. A stratified charge reciprocating internal combustion engine comprising a crankcase having at least one cylinder and supporting a cylinder head which houses an air inlet valve and an exhaust valve for said cylinder, air being admitted to said combustion chamber through an air inlet passage which is substantially unthrottled, thereby providing a minimum of restriction on the charge of incoming air, said air inlet passage being openable and closable by said air inlet valve, said air entering the combustion chamber in a flow path independent of any special air flow pattern or swirl pattern requirement to accommodate ignition of the fuel, a piston reciprocally movable in said cylinder to define a variable volume combustion chamber, a pilot fuel injection nozzle mounted in said cylinder head and positioned to discharge a pilot fuel charge into said combustion chamber, ignition means mounted in said cylinder head and positioned adjacent said pilot fuel injection nozzle, a main fuel injection nozzle mounted in said cylinder head and positioned to discharge a main fuel charge into said combustion chamber, means for causing said pilot fuel injection nozzle to discharge a pilot fuel charge into said combustion chamber and for causing said ignition means to ignite said pilot fuel charge as it is discharged into said combustion chamber to thereby cause a pilot fuel burn, the energy derived from said pilot fuel burn serving to increase the temperature and pressure of the gas in the combustion chamber, and means for causing said main fuel injection nozzle to discharge a main fuel charge into said combustion chamber on the compression stroke of said piston subsequent to said pilot fuel burn whereby auto ignition of said main fuel occurs, said main fuel injected into the combustion chamber by said main fuel nozzle being in a spray pattern shaped to fit the combustion chamber for best burning efficiency rather than being in a spray pattern which provides contact with a flame front established by the ignition of the pilot fuel, means for controlling the engine power output by varying the quantity of main fuel charge injected by said main fuel injection nozzle, whereby the air-fuel ratio will vary with load changes but will always be substantially in the lean mixture range, said internal combustion engine having a compression ratio which is in a range characteristic of the compression rato of a carbureted engine, whereby the internal combustion engine has a structural strength design characteristic of that of a carbureted engine rather than the heavy structure of a compression ignition engine.

16. A stratified charge reciprocating internal combustion engine as defined in claim 15 in which said main fuel charge is introduced from said main fuel injection nozzle into the combustion chamber commencing at a time when the piston is near the top dead center position on the compression stroke and the volume of the chamber is near the minimum.

17. A stratified charge reciprocating internal combustion engine as defined in claim 16 in which said main fuel charge is introduced from said main fuel injection nozzle into said combustion chamber when said piston is as much as 10° before top dead center during the compression stroke of said piston.

18. A stratified charge reciprocating internal combustion engine as defined in claim 15 in which the pilot fuel charge is introduced into the combustion chamber commencing substantially 12° to 50° before the top dead center position of the piston on the compression stroke of the piston.

19. A stratified charge reciprocating internal combustion engine as defined in claim 15 in which the quantity of pilot fuel charge injected by said pilot fuel injection nozzle is a constant quantity of fuel per injection throughout the operating range of the engine.

20. A stratified charge reciprocating internal combustion engine as defined in claim 19 in which the pilot fuel charge injected by said pilot fuel injection nozzle comprises approximately 75% of the engine idle fuel requirements.

21. A stratified charge reciprocating internal combustion engine as defined in claim 15 in which said pilot fuel injection nozzle and said main fuel injection are part of a fuel injection system which uses electrically triggered accumulator type injectors which operate at pressures substantially 3,000 pounds per square inch and above to supply the pilot and main fuel charges.

22. A stratified charge reciprocating internal combustion engine as defined in claim 15 which has a compression ratio substantially in the range of 8:1 to 10:1.

* * * * *